(12) United States Patent
Carson

(10) Patent No.: US 6,577,921 B1
(45) Date of Patent: Jun. 10, 2003

(54) CONTAINER TRACKING SYSTEM

(76) Inventor: Robert M. Carson, 2447 17th Ave., San Francisco, CA (US) 94116

( * ) Notice: Subject to any disclaimer, the term of this patent is extended or adjusted under 35 U.S.C. 154(b) by 421 days.

(21) Appl. No.: 09/723,047

(22) Filed: Nov. 27, 2000

(51) Int. Cl.$^7$ .............................................. G06F 17/60
(52) U.S. Cl. ...................... 700/214; 700/229; 701/207; 701/208; 340/850; 342/357.09
(58) Field of Search ................. 700/214, 229; 701/207, 208, 213; 205/22, 28; 340/850, 989, 990; 342/357.09

(56) References Cited

U.S. PATENT DOCUMENTS

| | | | |
|---|---|---|---|
| 4,973,219 A | 11/1990 | Brickner et al. .......... 414/792.9 |
| 5,038,283 A | 8/1991 | Caveney ..................... 364/403 |
| 5,565,858 A | * 10/1996 | Guthrie ................. 340/825.35 |
| 5,712,789 A | 1/1998 | Radican ................. 364/478.14 |
| 5,725,253 A | 3/1998 | Salive et al. ................... 283/67 |
| 5,835,377 A | 11/1998 | Bush ..................... 364/468.05 |
| 6,006,159 A | 12/1999 | Schmier et al. ............. 701/200 |
| 6,266,008 B1 | * 7/2001 | Huston et al. ......... 342/357.09 |
| 2002/0046142 A1 | * 4/2002 | Ishikura ....................... 705/28 |
| 2002/0070891 A1 | * 6/2002 | Huston et al. ......... 342/357.09 |

* cited by examiner

Primary Examiner—Emanuel Todd Voeltz
(74) Attorney, Agent, or Firm—Robert Charles Hill

(57) ABSTRACT

A container tracking system comprises a dispatcher workstation with a graphical user interface and a database. These are used to track the whereabouts of shipping containers in a storage and transfer yard. A mobile unit in the yard is attached to container handling equipment and monitors the container lock-on mechanism. When a container is locked on for a move, the mobile unit starts reporting positions and velocities to the dispatcher workstation over a radio channel. These positions and solutions are computed from a combination of GPS satellite navigation receiver solutions, inertial navigation, and local beacon markers. Reports stop when the container handling equipment unlocks from the container. The database then updates the new position for that container, and the graphical user interface can be used to "see" the container on a yard map.

14 Claims, 2 Drawing Sheets

CONTAINER TRACKING SYSTEM

BACKGROUND OF THE INVENTION

1. Field of the Invention

The present invention relates to material-handling systems, and more particularly to computerized systems for tracking the real-time locations of shipping containers.

2. Description of Related Art

On the West Coast of the United States, shipping container handling volumes have been increasing dramatically. In 1999, container twenty-foot equivalent units (TEU's) increased almost 10% to 8M TEU's. This was half of the total TEU's for the entire country. Ten years ago, the West Coast was handling less than 4M TEU's.

Such increases in handling volume are adversely affecting real-time order visibility. But every partner to the transactions needs to have access to location information throughout a container's journey. In port, containers are routinely not visible to the consignees, and this produces some consternation.

Yard operations are the most time consuming in overall average transactions. Out-gate operations take less time, guard operations require less than that, and in-gate operations are the least time consuming. During yard operations, a yard clerk must accompany the truck driver to validate the correct container for pick-up. But if the container is not where it is supposed to be, the typical yard clerk wanders around the yard looking for it. Then the equipment operator and truck driver have to be radioed to come to the new location. Even so, the right container might be buried by others that need to be moved out of the way, all while the yard clerk and truck driver are waiting. It would be better if the equipment operator could have the container free to load and in a verified location by the time the truck arrives.

Prior art systems and methods have experimented with attaching marks, markers, bugs, radios, GPS equipment, and other devices to the shipping containers. These devices then ride along through the entire trip. But putting such things on each container is expensive, and the devices are often blocked for some reason and not accessible. Device incompatibilities also are common because no world standard exists. It's hard enough to stick with a single standard within one storage and transfer yard.

The use of simple identification labels on material and the tracking of them is described by Harold Terrence Salive, et al., in U.S. Pat. No. 5,725,253, issued Mar. 10, 1998. The labels are visual graphics that are captured by a digital imaging camera.

Joseph Radican describes a container monitoring system and method in U.S. Pat. No. 5,712,789, issued Jan. 27, 1998. The system can generate status reports for customers, suppliers, and shippers about their respective containers. A container management information system is updated with container identification and location data.

A GPS navigation receiver is coupled with a cellphone, and both are attached to a shipping container in U.S. Pat. No. 5,835,377, issued Nov. 10, 1998, to Ronald Bush. Such tracking module is described as being built into each shipping container.

Each such patent mentioned herein is incorporated by reference.

SUMMARY OF THE INVENTION

Briefly, a container tracking system embodiment of the present invention comprises a dispatcher workstation with a graphical user interface and a database. These are used to track the whereabouts of shipping containers in a storage and transfer yard. A mobile unit in the yard is attached to container handling equipment and monitors the container lock-on mechanism. When a container is locked on for a move, the mobile unit starts reporting positions and velocities to the dispatcher workstation over a radio channel. These positions and solutions are computed from a combination of GPS satellite navigation receiver solutions, inertial navigation, and local beacon markers. Reports stop when the container handling equipment unlocks from the container. The database then updates the new position for that container, and the graphical user interface can be used to "see" the container on a yard map.

An advantage of the present invention is that a system is provided that keeps track of the locations of shipping containers in a storage and transfer yard.

Another advantage of the present invention is that a system is provided that reduces or eliminates the number of "lost" or misplaced shipping containers in a yard.

A further advantage of the present invention is that a system is provided that locates shipping containers to precise locations in a yard.

The above and still further objects, features, and advantages of the present invention will become apparent upon consideration of the following detailed description of specific embodiments thereof, especially when taken in conjunction with the accompanying drawings.

DETAILED DESCRIPTION OF THE INVENTION

Figure 1:
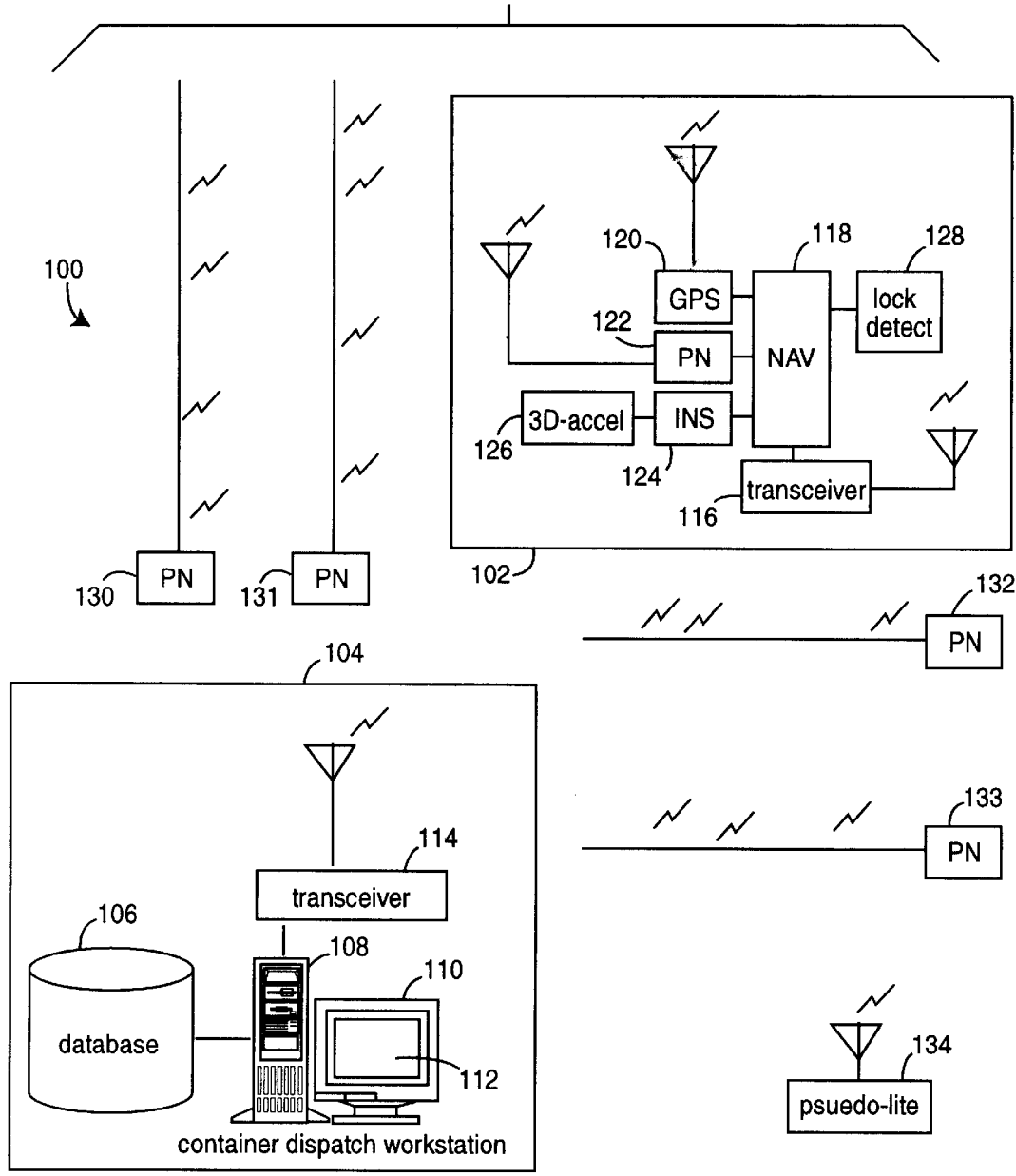
FIG. 1 is a functional block diagram of a container tracking system embodiment of the present invention.

FIG. 1 illustrates a container tracking system embodiment of the present invention, referred to herein by the reference numeral 100. The system 100 includes a mobile unit 102 that fastens to a bridle piece of container handling equipment, e.g., a rubber-tired transtainer or container crane, a side loader, a top loader, or a yard tractor. Such is in radio communication with a dispatcher's base station 104. A radio link between them communicates real-time position change information whenever a container is locked onto, moved, and released. The particular containers are identified by their starting positions in three-dimensional space. An index of container identities to their three-dimensional positions is kept in a database 106. A computer workstation 108 is connected to both the database 106 and a display screen 110. A graphical user interface (GUI) 112 is provided on-screen and can represent the three-dimensional positions of the containers in a yard being tracked with a map. Such map is preferably clickable, i.e., includes hypertext links that can be selected for navigating between elements and screen pages. Initial and corrective information about various containers can be entered by an authorized user at the workstation 108. A wireless transceiver 114 provides the actual communications link to a similar transceiver 116 in the mobile unit. A dispatcher at the base station 104 can instruct an operator at the mobile unit 102 as to which containers are to be moved where, e.g., by voice or by e-mail messaging. A computer program may later test to see that those instructions were followed correctly.

The mobile unit determines its position, e.g., from a mixture of at least one of global positioning system (GPS) satellite navigation receiver solutions, inertial navigation solutions (INS) and pseudo-noise (PN) beacon readings. A combination of all three is preferred for accuracy and availability. The INS provides continuous position solutions, but these are subject to long-term drift that is readily corrected by the GPS and PN. A navigation computer (NAV) 118 receives position data from a GPS receiver 120, a pseudo-noise receiver 122, and an inertial navigation computer 124. The GPS solutions can be improved by constraining the solutions with the storage yard's elevation, discrete container stacking heights, and the container yard's perimeters. These can be provided by a complete survey and mapping of the yard that is represented as an electronic terrain model and map in the database 106.

Suitable GPS receiver equipment is available from Trimble Navigation (Sunnyvale, Calif.). The INS can be implemented with an inertial measurement unit (ISIS-IMU) made by Inertial Science, Inc. (Newbury Park, Calif.).

A three-dimension accelerometer 126, for example, is used to provide direction of movement and movement acceleration magnitude information. A lock detector 128 senses when a container transporter has locked onto a container and is mechanically able to lift and relocate the container. Such locking triggers the NAV 118 to start generating movement and trajectory information, and the generated data is preferably sent in real-time back to the dispatcher base station 104. New information about container movements are used by the workstation 108 to update the database 106. The GUI 112 represents the current information in an easy to understand graphic map representation.

A network of PN beacons 130–133 are disposed at known positions throughout the container storage yard. When a mobile unit 102 passes over one, the survey information can be plugged in as correction data. In one embodiment, a form of differential correction information can be derived from the PN beacons to improve the solution accuracy of the GPS 120. Trigger-wires, light beams, lasers and other devices at strategic locations throughout the yard can be used by the PN beacons 130–133 to determine the exact boundary being crossed by the mobile unit 102. These can be homogeneous, except for their locations, and the GPS and INS solutions can be used to identify the particular PN beacon being encountered. The PN beacon mark can nail down a location fix to better than a centimeter, and this can be used to fine-tune and correct the GPS and INS solutions that are obtained between PN beacon locations.

A pseudo-lite 134 is alternatively positioned in the container storage yard at a known, well-surveyed position. It mimics an orbiting GPS satellite, and transmits an appropriate almanac and ephemeris associated with its fixed position. The GPS 120 accepts this as yet another datum in a constellation, and the pseudo-lite 134 may contribute greatly due to the advantageous solution geometries that can be obtained.

The practical implementations of the PN beacons 130–133 and PN receiver 122 may depend on different fundamental technologies, e.g., radio waves, laser beam interruption, recognition of patterns placed on the ground surface, etc. The object is to send a signal from a known location to the mobile unit 102 when it passes nearby, so that such signal can be interpreted as a physical-position calibration mark.

Figure 2:
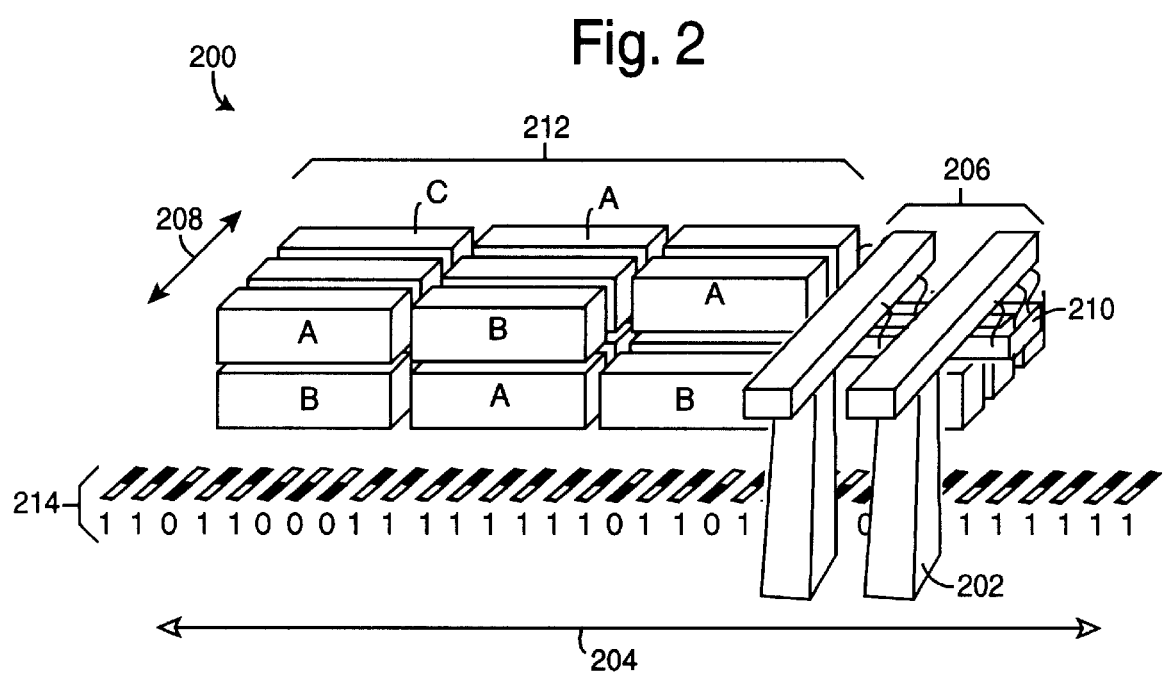
FIG. 2 is a perspective diagram of a transtainer in a container storage and transfer yard that uses the system of FIG. 1.

FIG. 2 shows a container handling system embodiment of the present invention, and is referred to herein by the general reference numeral 200. A transtainer 202 is able to move left and right along direction 204, e.g., along a railway or roadbed. The transtainer 202 has a gantry 206 that can reach out in a direction 208 with a bridle 210 to move any of a group of containers 212.

As an example of a typical logistic problem facing a storage and transfer yard, a number of containers "A" need to be shipped out today, a group "B" tomorrow, and a group "C" the day after. The bridle 210 is equipped with the mobile unit 102 (FIG. 1) and this makes it possible for a dispatcher to orchestrate the necessary moves that will make container groups "A", "B", and "C" available with the least amount of delay, confusion, effort, and labor. In alternative embodiments of the present invention, the workstation 108 includes a computer program for scheduling, logistical strategies, and position changes for the containers 212.

A row of magnets 214 are laid down in the roadbed at regular intervals and all in parallel. The directional placement of their magnetic poles spells out a code that can be magnetically read by PN receiver 122. Alternatively, a series of visual symbols can be substituted for the row of magnets 214, and the PN receiver reads them by a video imaging camera. The row of magnets 214 is laid out in a pattern that mimics a pseudo-random number (PRN). Such resembles the PRN modulation impressed on microwave carriers by GPS satellites and that are read by GPS receivers. The code phase of the PRN word corresponds to the physical position of the reader.

The PN receiver 122 reads a magnetic signal it receives from the row of magnets 214 as the transtainer 202 moves in direction 204. A code phase is determined and this is used by NAV 118 to compute the position of bridle 210 and any container it has locked to. Such magnetic codes can be laid out in any convenient direction, not just left and right as illustrated in FIG. 2.

A method embodiment of the present invention for managing inventories in a storage area comprises electronically mapping a three-dimensional storage area in which pieces of inventory come-in, go-out, and shuffle between internal locations. Then cataloging and indexing each piece of an inventory according to its identity and location within the storage area. A navigation computer is attached to a piece of machinery that is able to move the pieces of inventory around in the storage area. The method detects when the piece of machinery is attached to move any of the pieces of inventory. And it reports any position solutions derived from the navigation computer that can be attributed to movements of a particular piece of inventory. A database is updated with a new imputed position of each piece of inventory that has been moved to a new location by the piece of machinery.

Alternative embodiments further display a map representation of the storage area and each of the pieces of inventory on a computer screen through a graphical user interface (GUI).

The steps of attaching and detecting include attaching the navigation computer to a bridle on a transtainer, and detecting when the bridle locks onto a shipping container one of the pieces of inventory. The step of attaching can also include attaching a navigation computer which includes at least one of a navigation satellite receiver, inertial navigation sensor, and a pseudo-noise receiver.

Other embodiments of the present invention magnetically encode a digital pseudo-random number in a pattern along linear runs within the storage yard. The pattern is read as the piece of machinery passes by it. A code phase of the pattern is interpreted as correlating to a particular linear position within the storage area. And it used in the step of updating to associate a shipping container with its new position.

Although particular embodiments of the present invention have been described and illustrated, such is not intended to limit the invention. Modifications and changes will no doubt become apparent to those skilled in the art, and it is intended that the invention only be limited by the scope of the appended claims.

What is claimed is:

1. A container tracking system, comprising:
    a dispatcher workstation for association with a shipping container storage and transfer yard;
    a database associated with the dispatcher workstation and providing for the storage of location information related to a plurality of shipping containers located throughout the shipping container storage and transfer yard;
    a mobile unit for roaming around said shipping container storage and transfer yard and for attachment to a piece of container-handling equipment;
    a navigation computer disposed in the mobile unit and providing for three-dimensional position solutions of its location;
    a communications link between the mobile unit and the dispatcher workstation and providing for a transfer of said position solutions to the database; and
    a display connected to the dispatcher workstation and providing for a graphical user interface representing a number of map locations of said plurality of shipping containers that are derived from said location information in the database.

2. The system of claim 1, further comprising:
    a satellite-navigation receiver connected to provide position solutions to the navigation computer.

3. The system of claim 1, further comprising:
    an inertial navigation system connected to provide position solutions to the navigation computer.

4. The system of claim 1, further comprising:
    a pseudo-noise beacon connected to provide position information to the navigation computer that are triggered by the mobile unit passing by particular surveyed locations in said shipping container storage and transfer yard.

5. The system of claim 1, further comprising:
    a magnetic pattern placed within said shipping container storage and transfer yard and forming a digital encoding of a pseudo-random number, and further having a code-phase correlated to a linear location;
    a pseudo-noise receiver connected to provide position information to the navigation computer that are derived from magnetic readings obtained while passing by the magnetic pattern.

6. The system of claim 5, wherein:
    the magnetic pattern includes permanent magnets laid in alternating directions to effectuate digital bits in said pseudo-random number.

7. The system of claim 1, wherein:
    the mobile unit is attached to a bridle of a transtainer type of said container-handling equipment.

8. The system of claim 1, further comprising:
    a computer workstation having access to said database and including a computer program for orchestrating movements of said shipping containers according to future access requirements of said container-handling equipment.

9. The system of claim 1, further comprising:
    a satellite-navigation receiver, an inertial navigation system, and a pseudo-noise receiver connected to provide position estimates to the navigation computer, wherein a hybrid position solution is obtained.

10. A method of managing inventories in a storage area, the method comprising the steps of:
    electronically mapping a three-dimensional storage area in which pieces of inventory come-in, go-out, and shuffle between internal locations;
    cataloging and indexing each piece of an inventory according to its identity and location within said storage area;
    attaching a navigation computer to a piece of machinery able to move said pieces of inventory around in said storage area;
    detecting when said piece of machinery is attached to move any of said pieces of inventory;
    reporting position solutions derived from said navigation computer that can be attributed to movements of a particular piece of inventory; and
    updating a database with a new imputed position of each piece of inventory that has been moved to a new location by said piece of machinery.

11. The method of claim 10, further comprising the step of:
    displaying a map representation of said storage area and each of said pieces of inventory on a computer screen through a graphical user interface (GUI).

12. The method of claim 10, wherein:
    the steps of attaching and detecting include attaching said navigation computer to a bridle on a transtainer, and detecting when said bridle locks onto a shipping container one of said pieces of inventory.

13. The method of claim 10, wherein:
    the step of attaching include attaching said navigation computer which includes at least one of a navigation satellite receiver, inertial navigation sensor, and a pseudo-noise receiver.

14. The method of claim 10, further comprising the steps of:
    magnetically encoding a digital pseudo-random number in a pattern along linear runs within said storage yard;
    reading said pattern as said piece of machinery passes by it; and
    interpreting a code phase of said pattern as correlating to a particular linear position within said storage area.

* * * * *